(12) United States Patent
Mercuri et al.

(10) Patent No.: US 6,620,506 B2
(45) Date of Patent: *Sep. 16, 2003

(54) FLUID PERMEABLE FLEXIBLE GRAPHITE ARTICLE WITH ENHANCED ELECTRICAL AND THERMAL CONDUCTIVITY

(75) Inventors: Robert Angelo Mercuri, Seven Hills, OH (US); Thomas William Weber, Cleveland, OH (US); Michael Lee Warddrip, Parma, OH (US)

(73) Assignee: Advanced Energy Technology Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/256,036

(22) Filed: Sep. 26, 2002

(65) Prior Publication Data

US 2003/0024967 A1 Feb. 6, 2003

Related U.S. Application Data

(63) Continuation of application No. 09/490,975, filed on Jan. 24, 2000, now Pat. No. 6,506,484.

(51) Int. Cl.[7] ................................. B32B 3/26
(52) U.S. Cl. ............... 428/364.4; 428/131; 428/314.3; 429/231.8; 429/242; 429/247; 429/34; 429/145
(58) Field of Search ................... 428/131, 304.4, 428/319.1, 313.7, 318.9, 158, 314.3; 429/231.8, 242, 247, 34, 145

(56) References Cited

U.S. PATENT DOCUMENTS

| 3,404,061 A | 10/1968 | Shane et al. ............... 161/125 |
| 4,190,257 A | 2/1980 | Schnitzler .................. 277/102 |
| 4,226,821 A | 10/1980 | Ishikawa et al. ............ 264/134 |
| 4,752,518 A | 6/1988 | Lohrke et al. .............. 428/131 |
| 4,826,181 A | 5/1989 | Howard ...................... 277/112 |
| 4,895,713 A | 1/1990 | Greinke et al. ............. 423/448 |
| 4,988,583 A | 1/1991 | Watkins et al. .............. 429/30 |
| 5,102,855 A | 4/1992 | Greinke et al. ............. 502/425 |
| 5,108,849 A | 4/1992 | Watkins et al. .............. 429/30 |
| 5,176,863 A | 1/1993 | Howard ...................... 264/113 |
| 5,215,690 A * | 6/1993 | Golino et al. |
| 5,225,262 A | 7/1993 | Leduc ......................... 428/75 |
| 5,225,379 A | 7/1993 | Howard ...................... 501/99 |
| 5,228,701 A | 7/1993 | Greinke et al. ............. 277/102 |
| 5,266,421 A | 11/1993 | Townsend et al. .......... 429/192 |
| 5,300,370 A | 4/1994 | Washington et al. ......... 429/34 |
| 5,413,738 A * | 5/1995 | Lewis et al. |
| 5,476,679 A | 12/1995 | Lewis et al. ................ 427/122 |
| 5,494,506 A | 2/1996 | Ford et al. .................. 55/502 |
| 5,501,729 A * | 3/1996 | Lewis et al. |
| 5,527,363 A | 6/1996 | Wilkinson et al. ......... 29/623.1 |
| 5,531,454 A | 7/1996 | Borneby ...................... 277/26 |

(List continued on next page.)

FOREIGN PATENT DOCUMENTS

| EP | 0248918 | 6/1986 | |
| JP | 63157747 | 6/1988 | ........... B22D/11/10 |
| JP | 63242395 | 10/1988 | ............. C02F/3/10 |
| JP | 1123991 | 5/1989 | |
| JP | 8143856 | 6/1996 | ............. C09K/3/10 |
| JP | 8169478 | 7/1996 | ........... B65D/81/34 |
| JP | 54088911 | 7/1997 | ............ C04B/33/32 |

OTHER PUBLICATIONS

WO 95/16287. David P. Wilkinson et al. Embossed Fluid Flow Field Plate for Electrochemical Fuel Cells Publication Dated Jun. 15, 1995.

Primary Examiner—Tom Dunn
Assistant Examiner—Colleen P. Cooke
(74) Attorney, Agent, or Firm—Waddey & Patterson, P.C.; James R. Cartiglia

(57) ABSTRACT

Fluid permeable graphite article in the form of a perforated flexible graphite sheet having increased electrical and thermal conductivity transverse to the surfaces of the sheet.

10 Claims, 6 Drawing Sheets

U.S. PATENT DOCUMENTS

| | | | |
|---|---|---|---|
| 5,683,778 A | 11/1997 | Crosier | 428/59 |
| 5,707,755 A | 1/1998 | Grot | 429/40 |
| 5,824,199 A | 10/1998 | Simmons et al. | 204/262 |
| 5,885,729 A | 3/1999 | Marchetti | 429/42 |
| 5,902,762 A * | 5/1999 | Mercuri et al. | |
| 5,976,726 A | 11/1999 | Wilkinson et al. | 429/35 |
| 5,981,098 A | 11/1999 | Vitale | 429/34 |
| 6,045,677 A * | 4/2000 | Beetz, Jr. et al. | |
| 6,060,189 A * | 5/2000 | Mercuri et al. | |
| 6,087,034 A * | 7/2000 | Mercuri | |

* cited by examiner

US 6,620,506 B2

FLUID PERMEABLE FLEXIBLE GRAPHITE ARTICLE WITH ENHANCED ELECTRICAL AND THERMAL CONDUCTIVITY

FIELD OF THE INVENTION

This invention relates to an article formed of flexible graphite sheet which is fluid permeable in the transverse direction and has enhanced isotropy with respect to thermal and electrical conductivity.

BACKGROUND OF THE INVENTION

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties which are highly directional e.g. thermal and electrical conductivity and fluid diffusion. Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" or directions may be considered as the directions parallel to the carbon layers or the directions perpendicular to the "c" direction. The natural graphites suitable for manufacturing flexible graphite possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction and thus form an expanded or intumesced graphite structure in which the laminar character of the carbon layers is substantially retained.

Natural graphite flake which has been greatly expanded and more particularly expanded so as to have a final thickness or "c" direction dimension which is at least 80 or more times the original "c" direction dimension can be formed without the use of a binder into cohesive or integrated flexible graphite sheets of expanded graphite, e.g. webs, papers, strips, tapes, or the like. The formation of graphite particles which have been expanded to have a final thickness or "c" dimension which is at least 80 times the original "c" direction dimension into integrated flexible sheets by compression, without the use of any binding material is believed to be possible due to the excellent mechanical interlocking, or cohesion which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is at least 80 times that of the original particles so as to form a substantially flat, flexible, integrated graphite sheet. The expanded graphite particles which generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 5 pounds per cubic foot to about 125 pounds per cubic foot. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude, for the "c" and "a" directions.

This very considerable difference in properties, i.e. anisotropy, which is directionally dependent, can be disadvantageous in some applications. For example, in gasket applications where flexible graphite sheet is used as the gasket material and in use is held tightly between metal surfaces, the diffusion of fluid, e.g. gases or liquids, occurs more readily parallel to and between the major surfaces of the flexible graphite sheet. It would, in most instances, provide for improved gasket performance, if the resistance to fluid flow parallel to the major surfaces of the graphite sheet ("a" direction) were increased, even at the expense of reduced resistance to fluid diffusion flow transverse to the major faces of the graphite sheet ("c" direction). With respect to electrical properties, the resistivity of anisotropic flexible graphite sheet is high in the direction transverse to the major surfaces ("c" direction) of the flexible graphite sheet, and very substantially less in the direction parallel to and between the major faces of the flexible graphite sheet ("a" direction). In applications such as fluid flow field plates for fuel cells and seals for fuel cells, it would be of advantage if the electrical resistance transverse to the major surfaces of the flexible graphite sheet ("c" direction) were decreased, even at the expense of an increase in electrical resistivity in the direction parallel to the major faces of the flexible graphite sheet ("a" direction).

With respect to thermal properties, the thermal conductivity of a flexible graphite sheet in a direction parallel to the upper and lower surfaces of the flexible graphite sheet is relatively high, while it is relatively very low in the "c" direction transverse to the upper and lower surfaces.

The foregoing situations are accommodated by the present invention.

SUMMARY OF THE INVENTION

In accordance with the present invention, a graphite article is provided comprising a compressed mass of expanded graphite particles in the form of a sheet having parallel, opposed first and second surfaces. The sheet has a plurality of transverse fluid channels passing through said sheet between the parallel, opposed first and second surfaces, the channels being formed by mechanically impacting a surface of the sheet to displace graphite within the sheet at a plurality of predetermined locations to provide the channels with openings at the first and second parallel opposed surfaces. In a preferred embodiment, the channel openings at one of the parallel opposed surfaces are smaller than their respective openings at the other opposed surface whereby pressurized fluid in contact with the opposed surface having the smaller channel openings enters the respective channels at an initial velocity which is greater than the velocity of the fluid exiting the respective channels, i.e. the gas exit velocity is slowed. The article of the present invention is useful as a fluid permeable electrode in electrochemical fuel cells as hereinafter described.

BRIEF DESCRIPTION OF THE DRAWINGS

FIGS. 5, 6, 7 and 7(A) show a fluid permeable electrode assembly which includes a transversely permeable article in accordance with the present invention.

DETAILED DESCRIPTION OF THE INVENTION

Figure 1:
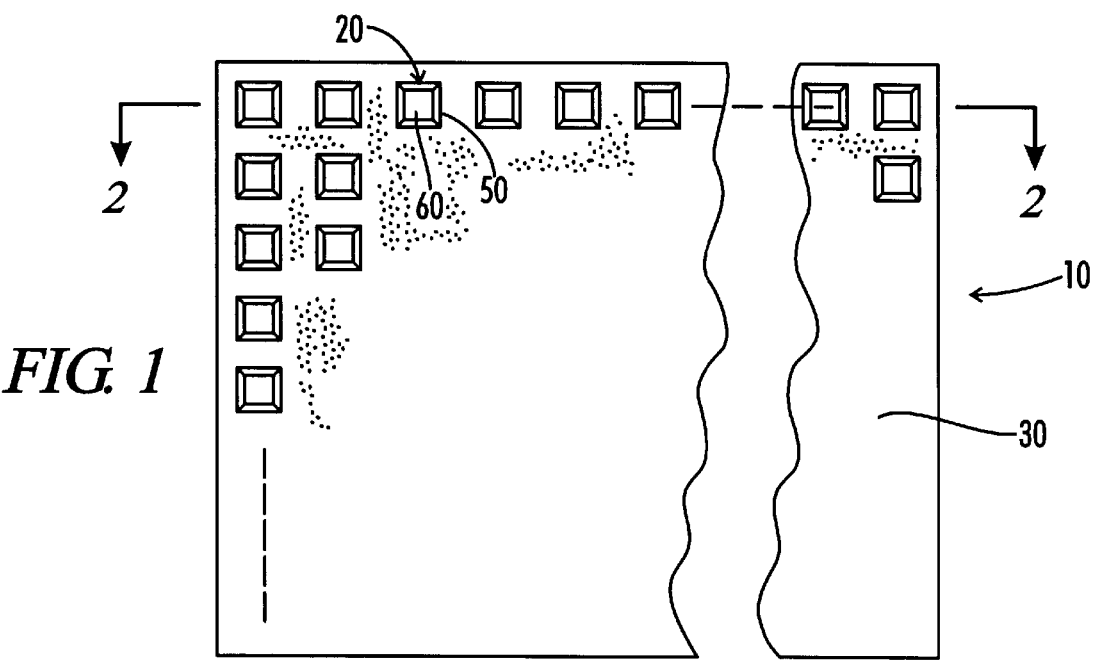
FIG. 1 is a plan view of a transversely permeable sheet of flexible graphite having transverse channels in accordance with the present invention.

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite". Upon exposure to high temperature, the particles of intercalated graphite expand in dimension as much as 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets which, unlike the original graphite flakes, can be formed and cut into various shapes and provided with small transverse openings by deforming mechanical impact.

A common method for manufacturing graphite sheet, e.g. foil from flexible graphite is described by Shane et al in U.S. Pat. No. 3,404,061 the disclosure of which is incorporated herein by reference. In the typical practice of the Shane et al method, natural graphite flakes are intercalated by dispersing the flakes in a solution containing an oxidizing agent of, e.g. a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated, any excess solution is drained from the flakes and the flakes are water-washed. The quantity of intercalation solution retained on the flakes after draining may range from 20 to 150 parts of solution by weight per 100 parts by weight of graphite flakes (pph) and more typically about 50 to 120 pph. Alternatively, the quantity of the intercalation solution may be limited to between 10 to 50 parts of solution per hundred parts of graphite by weight (pph) which permits the washing step to be eliminated as taught and described in U.S. Pat. No. 4,895,713 the disclosure of which is also herein incorporated by reference. The thus treated particles of graphite are sometimes referred to as "particles of intercalated graphite". Upon exposure to high temperature, e.g. 700° C. to 1000° C. and higher, the particles of intercalated graphite expand as much as 80 to 1000 or more times its original volume in an accordion-like fashion in the c-direction, i.e. in the direction perpendicular to the crystalline planes of the constituent graphite particles. The expanded, i.e. exfoliated graphite particles are vermiform in appearance, and are therefore commonly referred to as worms. The worms may be compressed together into flexible sheets which, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of 0.003 to 0.15 inch and a density of 0.1 to 1.5 grams per cubic centimeter. From about 1.5-30% by weight of ceramic additives, can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of 0.15 to 1.5 millimeters. The width of the particles is suitably from 0.04 to 0.004 mm. The ceramic fiber particles are non-reactive and non-adhering to graphite and are stable at temperatures up to 2000° F., preferably 2500° F. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

Figure 2:
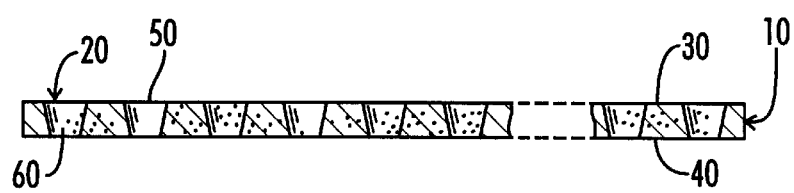
FIG. 2 is a side elevation view in section of the sheet of FIG. 1.
Figure 1A:
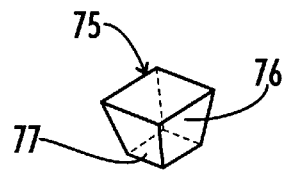
FIG. 1(A) shows a flat-ended protrusion element used in making the channels in the perforated sheet of FIG. 1.
Figure 2A:
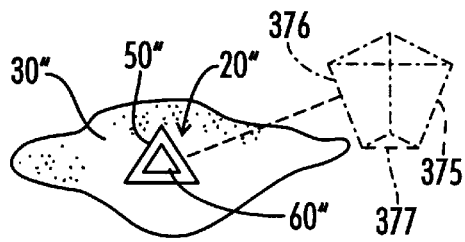
FIGS. 2(A), (B), (C) show various suitable flat-ended configurations for transverse channels in accordance with the present invention.
Figure 2B:
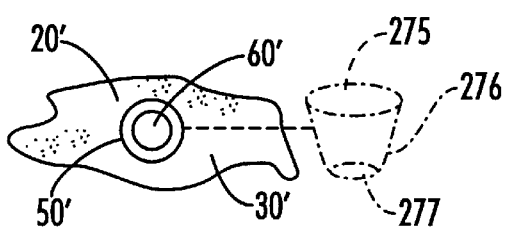
Figure 2C:
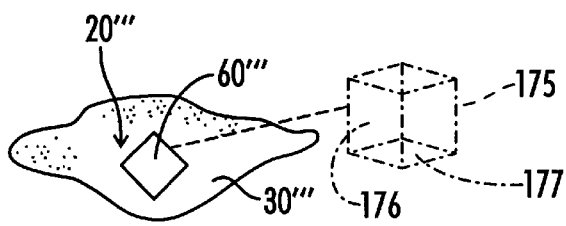
Figure 3:
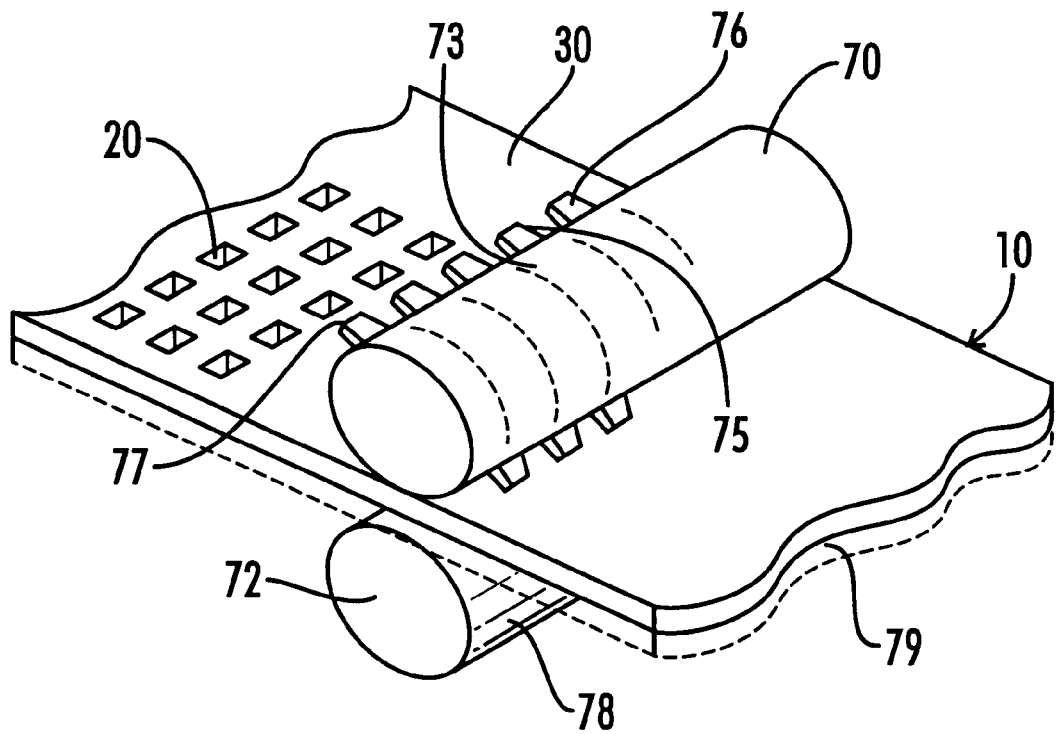
FIGS. 3, 3(A) shows a mechanism for making the article of FIG. 1.
Figure 3A:
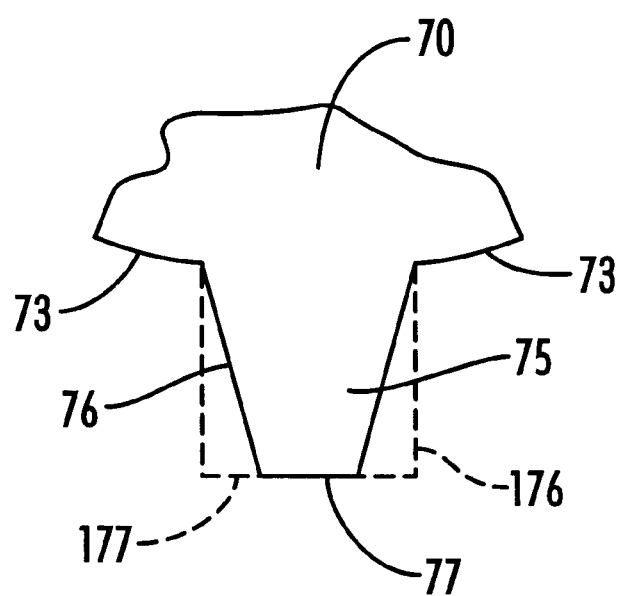
Figure 4:
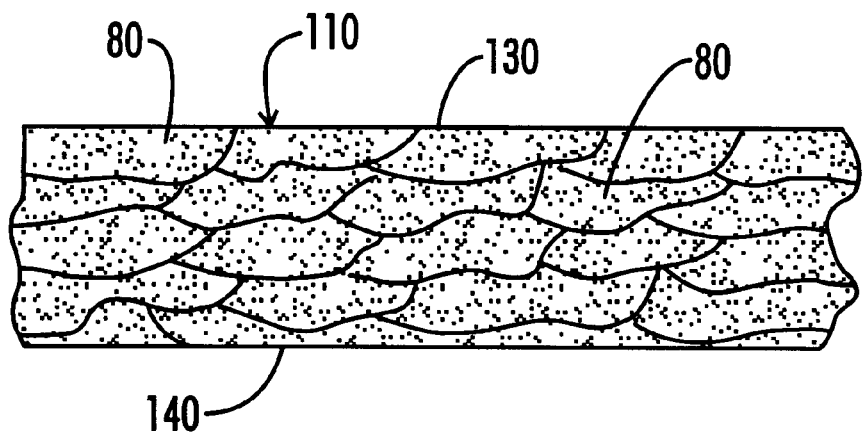
FIG. 4 shows an enlarged sketch of an elevation view of the oriented expanded graphite particles of prior art flexible graphite sheet material.
Figure 5:
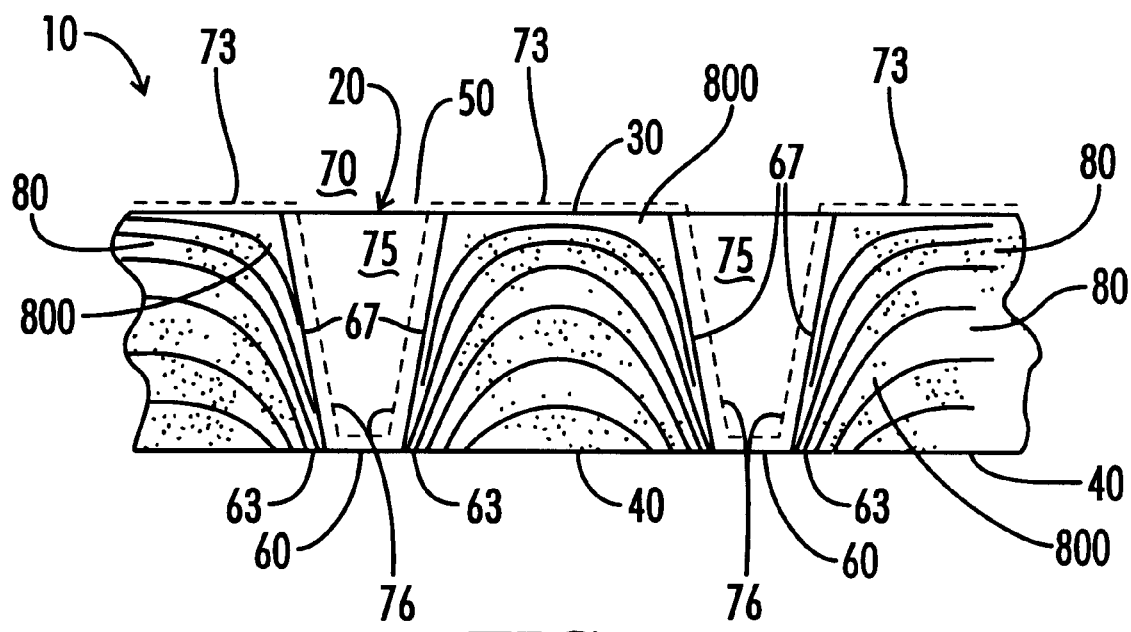
FIG. 5 is a sketch of an enlarged elevation view of an article formed of flexible graphite sheet in accordance with the present invention.

With reference to FIG. 1 and FIG. 2, a compressed mass of expanded graphite particles, in the form of a flexible graphite sheet is shown at 10. The flexible graphite sheet 10 is provided with channels 20, which are preferably smooth-sided as indicated at 67 in FIGS. 5 and 8, and which pass between the parallel, opposed surfaces 30, 40 of flexible graphite sheet 10. The channels 20 preferably have openings 50 on one of the opposed surfaces 30 which are larger than the openings 60 in the other opposed surface 40. The channels 20 can have different configurations as shown at 20'-20'''' in FIGS. 2(A), 2(B), 2(C) which are formed using flat-ended protrusion elements of different shapes as shown at 75, 175, 275, 375 in FIGS. 1(A) and 2(A), 2(B), 2(C), suitably formed of metal, e.g. steel and integral with and extending from the pressing roller 70 of the impacting device shown in FIG. 3. The smooth flat-ends of the protrusion elements, shown at 77, 177, 277, 377, and the smooth bearing surface 73, of roller 70, and the smooth bearing surface 78 of roller 72 (or alternatively flat metal plate 79), ensure deformation and complete displacement of graphite within the flexible graphite sheet, i.e. there are no rough or ragged edges or debris resulting from the channel-forming impact. Preferred protrusion elements have decreasing cross-section in the direction away from the pressing roller 70 to provide larger channel openings on the side of the sheet which is initially impacted. The development of smooth, unobstructed surfaces 63 surrounding channel openings 60, enables the free flow of fluid into and through smooth-sided (at 67) channels 20. In a preferred embodiment, openings one of the opposed surfaces are larger than the channel openings in the other opposed surface, e.g. from 1 to 200 times greater in area, and result from the use of protrusion elements having converging sides such as shown at 76, 276, 376. The channels 20 are formed in the flexible graphite sheet 10 at a plurality of predetermined locations by mechanical impact at the predetermined locations in sheet 10 using a mechanism such as shown in FIG. 3 comprising a pair of steel rollers 70, 72 with one of the rollers having truncated, i.e. flat-ended, prism-shaped protrusions 75 which impact surface 30 of flexible graphite sheet 10 to displace graphite and penetrate sheet 10 to form open channels 20. In practice, both rollers 70, 72 can be provided with "out-of-register" protrusions, and a flat metal plate indicated at 79, can be used in place of smooth-surfaced roller 72. FIG. 4 is an enlarged sketch of a sheet of flexible graphite 110 which shows a typical prior art orientation of compressed expanded graphite particles 80 substantially parallel to the opposed surfaces 130, 140. This orientation of the expanded graphite particles 80 results in anisotropic properties in flexible graphite sheets; i.e. the electrical conductivity and thermal conductivity of the sheet being substantially lower in the direction transverse to opposed surfaces 130, 140 ("c" direction) than in the direction ("a" direction) parallel to opposed surfaces 130, 140. In the course of impacting flexible graphite sheet 10 to form channels 20, as illustrated in FIG. 3, graphite is displaced within flexible graphite sheet 10 by flat-ended (at 77) protrusions 75 to push aside graphite as it travels to and bears against smooth surface 73 of roller 70 to disrupt and deform the parallel orientation of expanded graphite particles 80 as shown at 800 in FIG. 5. This region of 800, adjacent channels 20, shows disruption of the parallel orientation into an oblique, non-parallel orientation is optically observable at magnifications of 100× and higher. In effect the displaced graphite is being "die-molded" by the sides 76 of adjacent protrusions 75 and the smooth surface 73 of roller 70 as illustrated in FIG. 5. This reduces the anisotropy in flexible graphite sheet 10 and thus increases the electrical and thermal conductivity of sheet 10 in the direction transverse to the opposed surfaces 30, 40. A similar effect is achieved with frusto-conical and parallel-sided peg-shaped flat-ended protrusions 275 and 175. The perforated gas permeable flexible graphite sheet 10 of FIG. 1 can be used as an electrode in an electrochemical fuel cell 500 shown schematically in FIGS. 6, 7 and 7(A).

Figure 6:
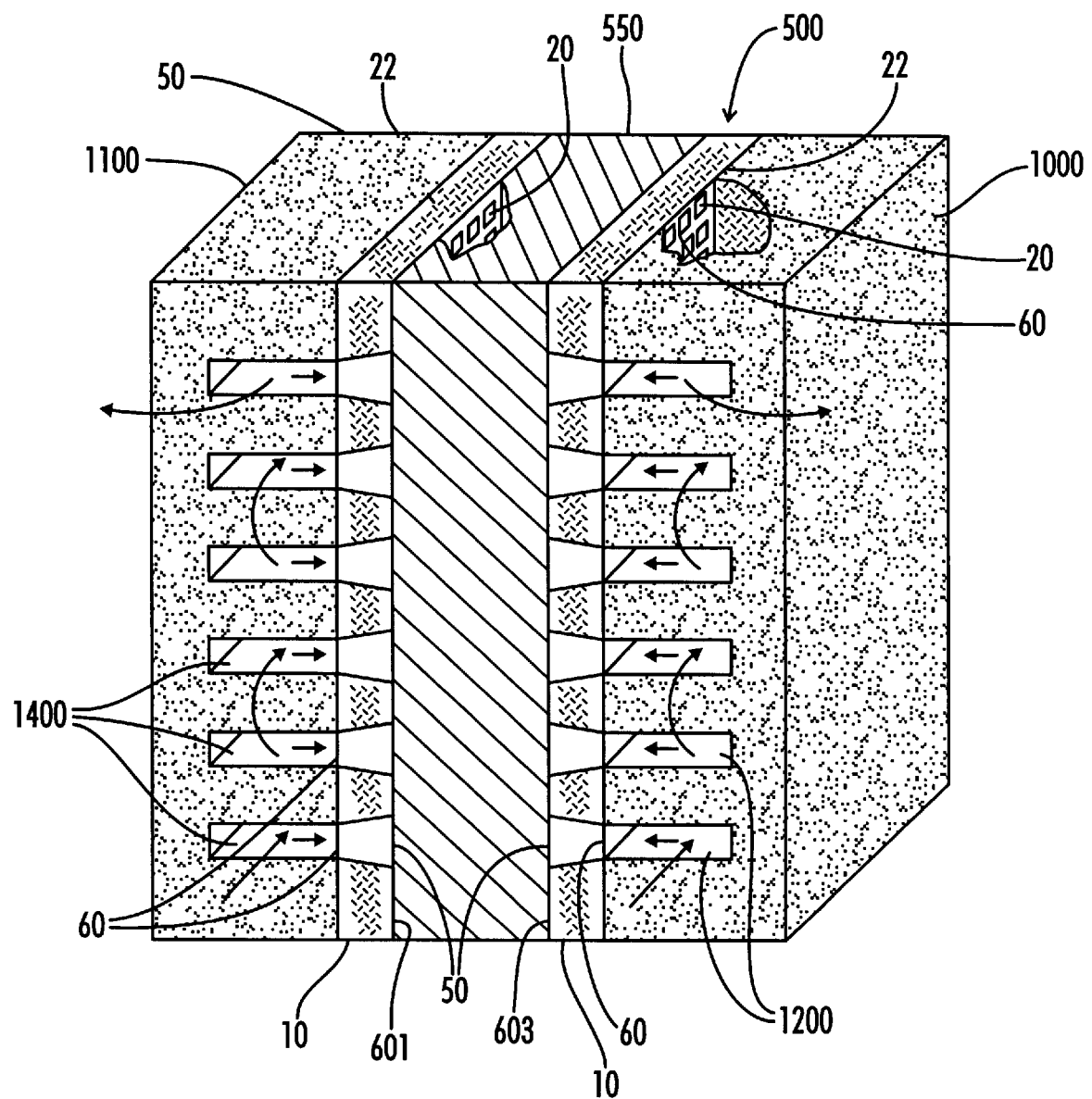
Figure 7A:
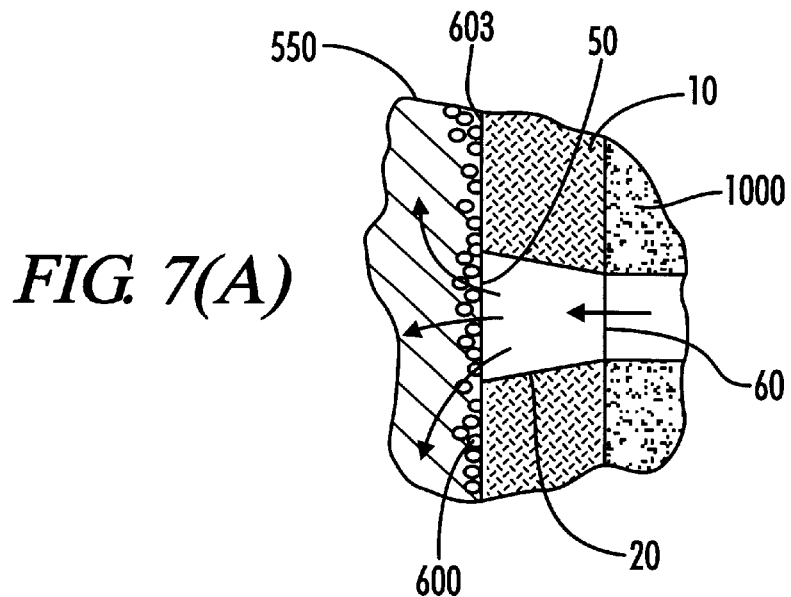
Figure 7:
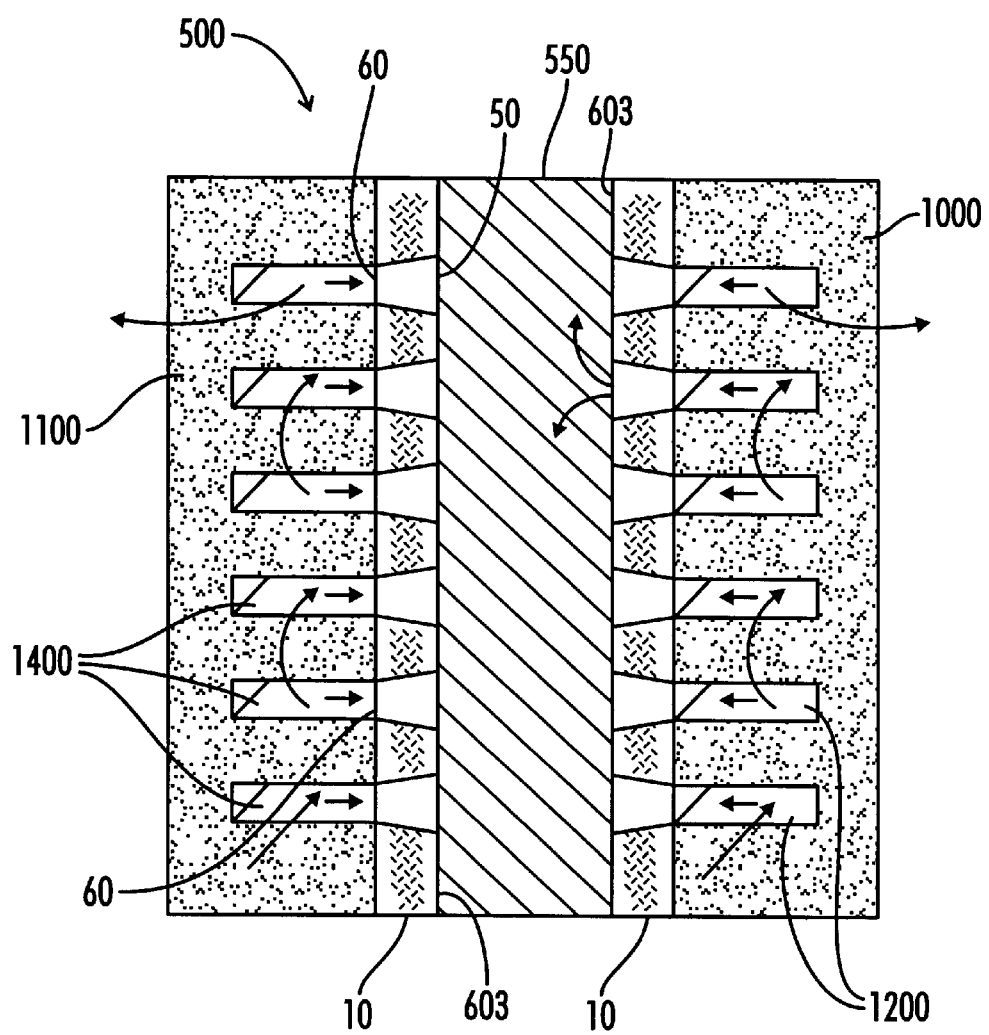

FIG. 6, FIG. 7 and FIG. 7(A) show, schematically, the basic elements of an electrochemical Fuel Cell, more complete details of which are disclosed in U.S. Pat. Nos. 4,988,583 and 5,300,370 and PCT WO 95/16287 (Jun. 15, 1995) and each of which is incorporated herein by reference.

With reference to FIG. 6, FIG. 7 and FIG. 7(A), the Fuel Cell indicated generally at 500, comprises electrolyte in the form of a plastic e.g. a solid polymer ion exchange membrane 550 catalyst coated at surfaces 601, 603, e.g. coated with platinum 600 as shown in FIG. 7(A); perforated flexible graphite sheet electrodes 10 in accordance with the present invention; and flow field plates 1000, 1100 which respectively abut electrodes 10. Pressurized fuel is circulated through grooves 1400 of fuel flow field pate 1100 and pressurized oxidant is circulated through grooves 1200. In operation, the fuel flow field plate 1100 becomes an anode, and the oxidant flow field plate 1000 becomes a cathode with the result that an electric potential, i.e. voltage is developed between the fuel flow field plate 1000 and the oxidant flow field plate 1100. The above described electrochemical fuel cell is combined with others in a fuel cell stack to provide the desired level of electric power as described in the above-noted U.S. Pat. No. 5,300,370.

The operation of Fuel Cell 500 requires that the electrodes 10 be porous to the fuel and oxidant fluids, e.g. hydrogen and oxygen, to permit these components to readily pass from the grooves 1400, 1200 through electrodes 10 to contact the catalyst 600, as shown in FIG. 7(A), and enable protons derived from hydrogen to migrate through ion exchange membrane 550. In the electrode 10 of the present invention, channels 20 are positioned to adjacently cover grooves 1400, 1200 of the flow field plates so that the pressurized gas from the grooves passes through the smaller openings 60 of channels 20 and exits the larger openings 50 of channels 20. The initial velocity of the gas at the smaller openings 60 is higher than the gas flow at the larger openings 50 with the result that the gas is slowed down when it contacts the catalyst 600 and the residence time of gas-catalyst contact is increased and the area of gas exposure at the membrane 550 is maximized. This feature, together with the increased electrical conductivity of the flexible graphite electrode of the present invention enables more efficient fuel cell operation.

Figure 8:
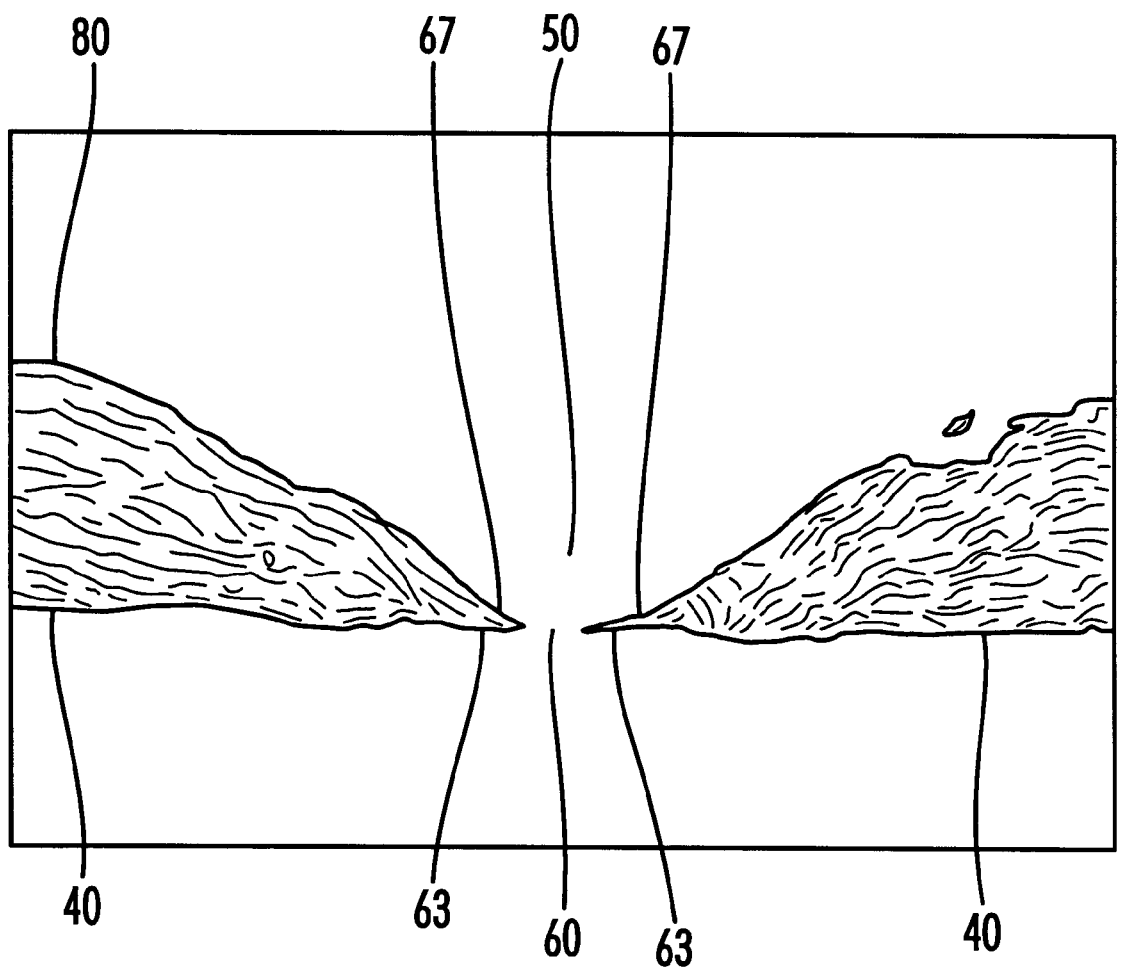
FIG. 8 is a photograph at 100× (original magnification) corresponding to a portion of the side elevation view sketch of FIG. 5.

FIG. 8 is a photograph (original magnification 100×) of a body of flexible graphite corresponding to a portion of the sketch of FIG. 5.

The articles of FIGS. 1 and 5 and the material shown in the photograph (100×) of FIG. 8 can be shown to have increased thermal and electrical conductivity in the direction transverse to opposed parallel, planar surfaces 30, 40 as compared to the thermal and electrical conductivity in the direction transverse to surfaces 130, 140 of prior art material of FIG. 4 in which particles of expanded natural graphite unaligned with the opposed planar surfaces are not optically detectable.

A sample of a sheet of flexible graphite 0.01 inch thick having a density of 0.3 grams/cc, representative of FIG. 4, was mechanically impacted by a device similar to that of FIG. 3 to provide channels of different size in the flexible graphite sheet. The transverse ("c" direction) electrical resistance of the sheet material samples was measured and the results are shown in the table below.

Also, the transverse gas permeability of channeled flexible graphite sheet samples, in accordance with the present invention, was measured, using a Gurley Model 4118 for Gas Permeability Measurement.

Samples of channeled flexible graphite sheet in accordance with the present invention were placed at the bottom opening (⅜ in. diam.) of a vertical cylinder (3 inch diameter cross-section). The cylinder was filled with 300 cc of air and a weighted piston (5 oz.) was set in place at the top of the cylinder. The rate of gas flow through the channeled samples was measured as a function of the time of descent of the piston and the results are shown in the table below.

| Flexible Graphite Sheet (0.01 inch thick; density = 0.3 gms/cc) | | | |
|---|---|---|---|
| | No Channels | 1600 channels per square inch-0.020 inch wide at top; 0.005 inch wide at bottom | 250 channels per square inch-0.020 inch wide at top; 0.007 inch wide at bottom |
| Transverse Electrical Resistance (micro ohms) | 80 | 8 | 0.3 |
| Diffusion Rate-Seconds | — | 8 seconds | 30 seconds |

In the present invention, for a flexible graphite sheet having a thickness of 0.003 inch to 0.015 inch adjacent the channels and a density of 0.5 to 1.5 grams per cubic centimeter, the preferred channel density is from 1000 to 3000 channels per square inch and the preferred channel size is a channel in which the ratio of the area of larger channel opening to the smaller is from 50:1 to 150:1.

In the practice of the present invention, the flexible graphite sheet can, at times, be advantageously treated with resin and the absorbed resin, after curing, enhances the moisture resistance and handling strength, i.e. stiffness of the flexible graphite sheet. Suitable resin content is preferably 20 to 30% by weight, suitably up 60% by weight.

The article of the present invention can be used as electrical and thermal coupling elements for integrated circuits in computer applications, as conformal electrical contact pads and as electrically energized grids in de-icing equipment.

The above description is intended to enable the person skilled in the art to practice the invention. It is not intended to detail all of the possible variations and modifications which will become apparent to the skilled worker upon reading the description. It is intended, however, that all such modifications and variations be included within the scope of the invention which is defined by the following claims. The claims are intended to cover the indicated elements and steps in any arrangement or sequence which is effective to meet the objectives intended for the invention, unless the context specifically indicates the contrary.

What is claimed is:

1. A fluid permeable graphite article comprising a compressed mass of expanded graphite particles in the form of a sheet having parallel, opposed first and second surfaces, said sheet having a plurality of transverse fluid channels passing through said sheet between said first and second parallel, opposed surfaces, said channels having openings at both of said first and second parallel, opposed surfaces, wherein the channel openings at said first surface are from 50 to 150 times larger in area than the channel openings at said second surface.

2. Article in accordance with claim 1 wherein said compressed mass of expanded graphite particles is characterized by expanded graphite particles adjacent said channels extending obliquely with respect to said parallel opposed surfaces.

3. Article in accordance with claim 1 wherein the channel openings at said second surface of said sheet are surrounded by a planar graphite surface free of obstructions which would impede flow of fluid into the channel openings at said second surface.

4. Article in accordance with claim 1 wherein 1000 to 3000 channels per square inch are present in said sheet.

5. Article in accordance with claim 1 wherein said graphite sheet has a thickness of 0.003 inch to 0.015 inch adjacent said channels and a density of 0.5 to 1.5 grams per cubic centimeter.

6. A fluid permeable graphite electrode comprising a compressed mass of expanded graphite particles in the form of a sheet having parallel, opposed first and second surfaces, said sheet having a plurality of transverse fluid channels passing through said sheet between said first and second parallel, opposed surfaces, said channels having openings at both of said first and second parallel, opposed surfaces, wherein the channel openings at said first surface are from 50 to 150 times larger in area than the channel openings at said second surface.

7. Electrode in accordance with claim 6 wherein said compressed mass of expanded graphite particles is characterized by expanded graphite particles adjacent said channels extending obliquely with respect to said parallel opposed surfaces.

8. Electrode in accordance with claim 6 wherein the channel openings at said second surface of said sheet are surrounded by a planar graphite surface free of obstructions which would impede flow of fluid into the channel openings at said second surface.

9. Electrode in accordance with claim 6 wherein 1000 to 3000 channels per square inch are present in said sheet.

10. Electrode in accordance with claim 6 wherein said graphite sheet has a thickness of 0.003 inch to 0.015 inch adjacent said channels and a density of 0.5 to 1.5 grams per cubic centimeter.

* * * * *